United States Patent [19]

Ramun

[11] 3,916,520

[45] Nov. 4, 1975

[54] METAL CUTTING TOOL

[76] Inventor: Michael Ramun, 3180 Fifth Ave., Youngstown, Ohio 44505

[22] Filed: June 20, 1974

[21] Appl. No.: 481,387

[52] U.S. Cl. ................................................. 30/277
[51] Int. Cl.² ........................................ B26B 27/00
[58] Field of Search ....................... 30/277; 173/126

[56] References Cited
UNITED STATES PATENTS

| 60,136 | 12/1866 | Casebeer | 30/314 |
|---|---|---|---|
| 643,698 | 2/1900 | Troxel | 30/315 UX |
| 988,484 | 4/1911 | McDonald | 30/314 X |
| 2,006,874 | 7/1935 | Rich | 30/314 |
| 2,141,224 | 12/1938 | Rich | 30/314 |
| 2,171,050 | 8/1939 | Slawson | 30/317 |

Primary Examiner—Al Lawrence Smith
Assistant Examiner—J. T. Zatarga
Attorney, Agent, or Firm—Webster B. Harpman

[57] ABSTRACT

A metal cutting tool for use in cutting steel plate as found for example in structures such as large petroleum storage tanks and the like is disclosed and consists of a cutting blade positioned in an inverted U-shaped guide which is attached to a two or three ton weight. The tool is elevated by suitable means and dropped so that the inverted U-shaped guide engages the upper edge of a metal plate to be cut.

5 Claims, 4 Drawing Figures

METAL CUTTING TOOL

BACKGROUND OF THE INVENTION

1. Field of the Invention

This invention relates to metal cutting tools such as employed to cut heavy metal sheets or metal plates such as hereinbefore generally cut by cutting torches and the like.

2. Description of the Prior Art

Prior devices comprise cutting tools as seen in U.S. Pat. No. 3,577,638 wherein a reciprocable power actuated plunger moves a blade relative to sheet metal for cutting the same. U.S. Pat. No. 3,694,918 provides a sheet metal cutting tool with a reciprocal weighted hammer for initially puncturing the sheet metal, the device then being moved in the manner of a lever relative to the work so as to cut the sheet metal. Guided cutting or splitting blades are seen in U.S. Pat. Nos. 1,034,675 and 2,087,321. No prior art is known wherein a U-shaped guide with a cutting blade is attached to a very heavy weight and dropped on the edge of vertically standing metal plates as in a storage tank to cut the same.

SUMMARY OF THE INVENTION

A metal cutting tool comprising a 2 or 3 ton weight has an inverted U-shaped guide affixed to one side thereof adjacent its upper end with a cutting blade in the base of the inverted U-shaped guide. Heavy steel plate as in a cylindrical storage tank wall is readily cut by alternately lifting and dropping the tool so as to engage the cutting blade along a desired cutting line.

DESCRIPTION OF THE PREFERRED EMBODIMENT

Figure 1:
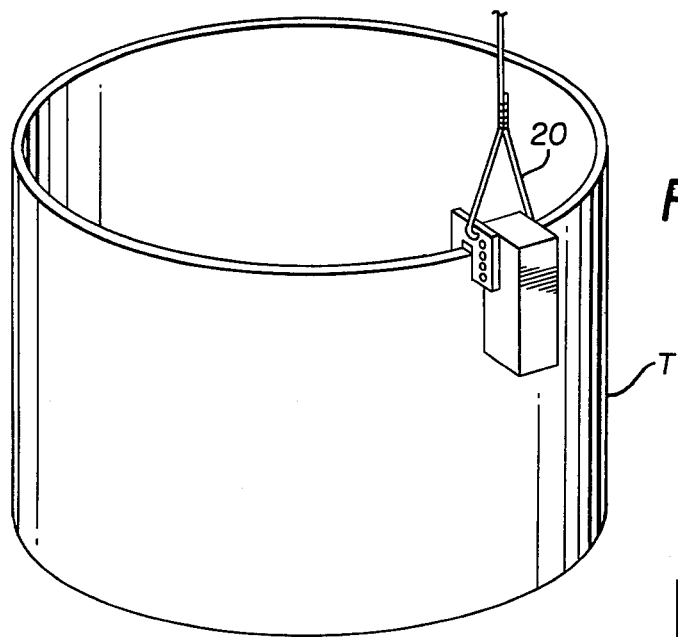
FIG. 1 is a perspective elevation of a cylindrical storage tank with the cutting tool shown in position on the upper edge thereof.

In the form of the invention chosen for illustration and description herein the metal cutting tool consists of a preferably elongated vertically standing weight 10 as for example a 2 or 3 ton steel ingot. An inverted U-shaped guide 11 is attached to the weight 10 by fasteners such as indicated at 12 in the drawings or by welding the guide 11 to the weight 10 as will occur to those skilled in the art. The guide 11 defines a vertical slot 13 which is of sufficient width to receive steel plate to be cut by the device, as for example the vertical wall of a cylindrical storage tank as seen in FIG. 1 of the drawings wherein the tank is indicated by the letter T.

Figure 2:
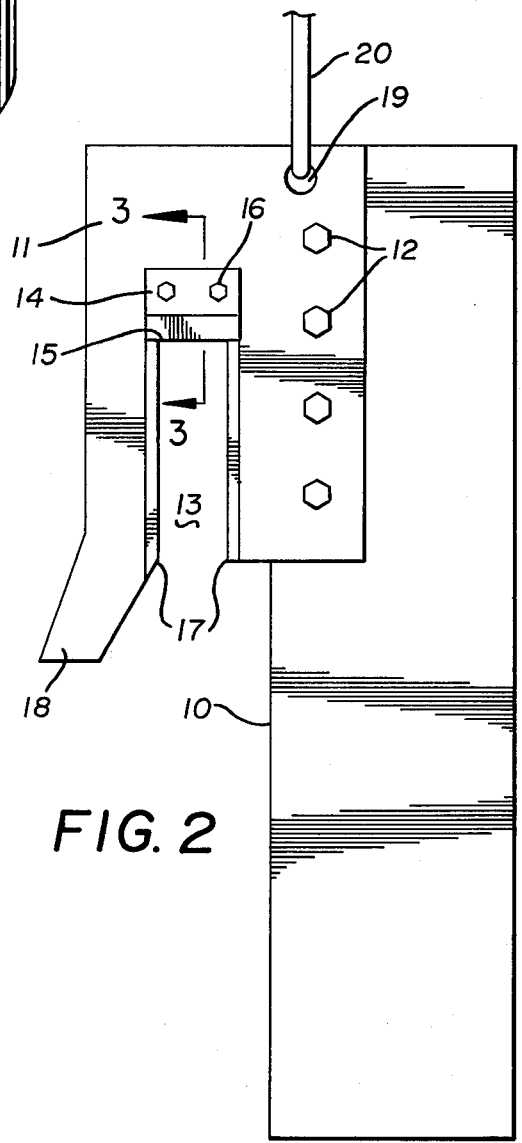
FIG. 2 is an enlarged side elevation of the cutting tool.
Figure 3:
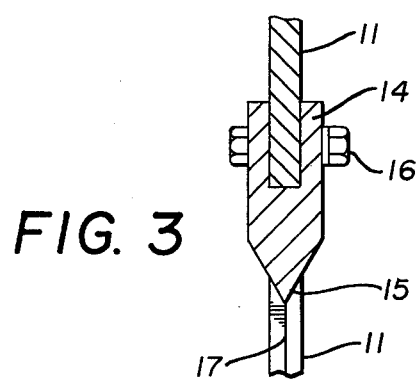
FIG. 3 is an enlarged cross section on line 3—3 of FIG. 2.
Figure 4:
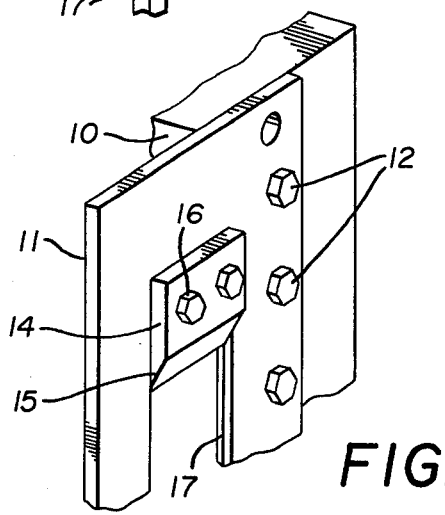
FIG. 4 is a perspective view with parts broken away illustrating a portion of the metal cutting tool.

Referring to FIG. 2 of the drawings in particular it will be seen that a replaceable cutting blade 14 having a knife-like edge 15 is attached to the inverted U-shaped guide 11 at the upper end of the slot 13 therein as best seen in FIGS. 3 and 4 of the drawings with the removable blade 14 being secured to the inverted U-shaped guide 11 by means of fasteners 16.

The blade 14 disclosed herein is shown as being bifurcated and positioned over a portion of the inverted U-shaped guide 11. Such an arrangement will locate the sharpened knife like edge 15 thereof on the axial center line of the vertical slot 13 where it will also correspond with V-shaped configurations 17 on the edges of the inverted U-shaped guide 11 defining the vertical slot 13. The inverted U-shaped guide 11 is preferably but not necessarily provided with an outwardly turned extending guide portion 18 so as to enable the cutting tool to be more readily aligned with the upper edge, for example of a metal plate structure to be cut by the tool. An aperture 19 is positioned through the inverted U-shaped guide 11 and the weight 10 as seen in FIGS. 1 and 2 of the drawings and a steel cable or the like 20 is positioned therethrough and extends upwardly to a lifting device by which the cutting tool may be alternately lifted and dropped as will occur to those skilled in the art.

By referring now to FIG. 1 of the drawings it will be seen that the cylindrical tank T such as a large petroleum storage tank is illustrated with the metal cutting tool in initial cutting position on the upper edge thereof. Repeated lifting and dropping of the tool will rapidly cut the thick metal plate of the tank T on a vertical line and considerable time and expense saved as compared with cutting the same tank with metal cutting torches as has heretofore been customary in demolition work and the like.

It will occur to those skilled in the art that various metal structures being dismantled and steel structures being dismantled and steel structures in particular being cut up for melting scrap may be rapidly and inexpensively cut with the metal tool herein. Such structures include the cylindrical tanks hereinbefore mentioned, vessel hulls, various heavy metal processing equipment, metal railway cars and many other metal structures formed of heavy metal plates or the like. Although but one embodiment of the present invention has been illustrated and described it will be apparent to those skilled in the art that various changes and modifications may be made therein without departing from the spirit of the invention.

Having thus described my invention what I claim is:

1. A metal cutting tool consisting of a weight, a guide structure secured thereto and extending sidewardly and downwardly therefrom, a cutting blade mounted in said guide structure, said guide structure defining a vertical slot open at its lower end with the metal cutting blade positioned at the opposite upper end of said slot and positioning the cutting edge of said cutting blade in said slot, means in said guide structure and weight to which a supporting element can be attached whereby the metal cutting tool may be alternately lifted and dropped so as to move downwardly in a cutting action in a metal plate to be cut.

2. The metal cutting tool set forth in claim 1 and wherein the guide structure is an inverted U-shaped metal member.

3. The metal cutting tool set forth in claim 1 wherein the cutting blade is a bifurcated member positioned on said guide structure.

4. The metal cutting tool set forth in claim 1 wherein the guide structure is an inverted U-shaped member defining a vertically extending slot, the sides of the structure defining the slot being tapered to form knife edges on the common center line of the guide structure.

5. The metal cutting tool set forth in claim 1 wherein the weight is vertically elongated, the guide structure is attached to one side thereof near the upper end thereof so that a majority of the guide structure and the elongated weight lie below the cutting blade.

\* \* \* \* \*